(12) United States Patent
Reymann et al.

(10) Patent No.: US 9,910,489 B2
(45) Date of Patent: Mar. 6, 2018

(54) TRANSIT VENDING MACHINE WITH AUTOMATIC USER INTERFACE ADAPTION

(71) Applicant: Cubic Corporation, San Diego, CA (US)

(72) Inventors: Steffen Reymann, Reigate (GB); Gavin Smith, Crawley (GB); Jon Packham, Ashford (GB)

(73) Assignee: CUBIC CORPORATION, San Diego, CA (US)

( * ) Notice: Subject to any disclaimer, the term of this patent is extended or adjusted under 35 U.S.C. 154(b) by 0 days.

(21) Appl. No.: 14/935,269

(22) Filed: Nov. 6, 2015

(65) Prior Publication Data

US 2016/0132104 A1     May 12, 2016

Related U.S. Application Data

(60) Provisional application No. 62/077,008, filed on Nov. 7, 2014.

(51) Int. Cl.
| | |
|---|---|
| *G06F 3/01* | (2006.01) |
| *G06F 3/0489* | (2013.01) |
| *G06K 9/00* | (2006.01) |
| *G07F 7/00* | (2006.01) |
| *G06F 3/041* | (2006.01) |

(Continued)

(52) U.S. Cl.
CPC .............. *G06F 3/011* (2013.01); *G06F 3/017* (2013.01); *G06F 3/0416* (2013.01); *G06F 3/0488* (2013.01); *G06F 3/04897* (2013.01); *G06K 9/00389* (2013.01); *G07F 7/005* (2013.01); *G07F 9/023* (2013.01)

(58) Field of Classification Search
CPC .......... G06F 3/017; G06F 3/012; G06F 3/013; G06F 3/011; G06F 3/014; G06F 3/04897
See application file for complete search history.

(56) References Cited

U.S. PATENT DOCUMENTS

| | | | | |
|---|---|---|---|---|
| 8,549,442 | B2 * | 10/2013 | Marks ..................... | G06F 3/017 |
| | | | | 715/838 |
| 8,982,109 | B2 * | 3/2015 | Vilcovsky .............. | H04N 7/144 |
| | | | | 345/204 |

(Continued)

FOREIGN PATENT DOCUMENTS

| | | |
|---|---|---|
| CN | 103235645 A | 8/2013 |
| EP | 3216013 A1 | 9/2017 |

(Continued)

OTHER PUBLICATIONS

Situated Interaction with Ambient Information Facilitating Awareness and Communication in Ubiquitous Work Environments; Norbet Streitz et al. © 2003.*

(Continued)

*Primary Examiner* — Sherrod Keaton
(74) *Attorney, Agent, or Firm* — Kilpatrick Townsend & Stockton

(57) ABSTRACT

Techniques are disclosed for providing a transit vending machine that accommodates its users by automatically adjusting a layout of the user interface based on information determined about the user as obtained from image information of the user. Information about the user can be indicative of user height, hand used to interact with the touchscreen display, an offset of user input, and the like.

12 Claims, 7 Drawing Sheets

(51) Int. Cl.
*G07F 9/02* (2006.01)
*G06F 3/0488* (2013.01)

(56) References Cited

U.S. PATENT DOCUMENTS

| | | | | |
|---|---|---|---|---|
| 2009/0325716 | A1* | 12/2009 | Harari | G07F 17/32 |
| | | | | 463/42 |
| 2010/0085317 | A1* | 4/2010 | Park | G06F 1/1626 |
| | | | | 345/173 |
| 2010/0241957 | A1* | 9/2010 | Kim | G06F 3/0416 |
| | | | | 715/702 |
| 2013/0013105 | A1* | 1/2013 | Lutz | G07F 19/205 |
| | | | | 700/232 |
| 2013/0252691 | A1* | 9/2013 | Alexopoulos | G07F 17/3206 |
| | | | | 463/17 |
| 2014/0282274 | A1 | 9/2014 | Everitt et al. | |

FOREIGN PATENT DOCUMENTS

| | | |
|---|---|---|
| WO | 2010/030984 A1 | 3/2010 |
| WO | 2016/073938 A1 | 5/2016 |

OTHER PUBLICATIONS

International Search Report and Written Opinion for PCT/US2015/059597, dated Jan. 12, 2016, 11 pages.
International Preliminary Report on Patentability dated May 18, 2017 for International Patent Application PCT/US2015/059597; all pages.

\* cited by examiner

TRANSIT VENDING MACHINE WITH AUTOMATIC USER INTERFACE ADAPTION

CROSS-REFERENCES TO RELATED APPLICATIONS

The present application claims benefit under 35 USC 119(e) of U.S. Provisional Application No. 62/077,008, filed on Nov. 7, 2014, entitled "Automatic User Interface Adaptation," which is incorporated by reference herein in their entirety.

BACKGROUND

Passengers of transit systems often utilize transit vending machines to obtain information regarding the transit system and/or purchase transit products and services, rather than seeing a human transit agent. Although these transit vending machines can facilitate purchases and obtaining information with interactive touchscreen displays, the user interface displayed thereon can often fail to accommodate or adjust to the needs of an individual user.

BRIEF SUMMARY

Techniques are disclosed for providing a transit vending machine that accommodates its users by automatically adjusting a layout of the user interface based on information determined about the user as obtained from image information of the user. Information about the user can be indicative of user height, hand used to interact with the touchscreen display, an offset of user input, and the like.

An example transit system vending machine, according to the disclosure comprises a touchscreen display configured to display a first output in accordance with a first layout configuration. The first layout configuration determines a first area of the touchscreen display in which one or more interactive controls are located, and the first output comprises a first set of displayed elements including a first set of one or more interactive controls disposed in the first area of the touchscreen display and at least one other displayed element. The transit system vending machine further includes a camera configured to capture an image of a user of the transit system vending machine and provide the captured image to a processing unit, and the processing unit, communicatively coupled to the touchscreen display and the camera. The processing unit is configured to receive the captured image of the user from the camera, conduct image analysis of the captured image of the user to determine that a triggering event occurred. The triggering event comprises the user approaching the transit system vending machine, or the user raising a hand to press one of the first set of one or more interactive controls. The processing unit is configured to, in response to determining that a triggering event occurred, cause the transit system vending machine to automatically generate and display a second output on the touchscreen display in accordance with a second layout configuration. The second layout configuration determines a second area of the touchscreen display in which one or more interactive controls are located, and the second area is different than the first area.

The example transit system vending machine can include one or more of the following features. The processing unit may be further configured to, when the triggering event is determined to comprise the user approaching the transit system vending machine, cause the second output to include, in the second area of the touchscreen display, the first set of one or more interactive controls. The processing unit may be further configured to determine, from first image information captured by the camera, that a height of the user is above a certain threshold, wherein the second area of the touchscreen display comprises an upper portion of the touchscreen display. The processing unit may be further configured to make the determination regarding the height of the user based on the image information, wherein the image information comprises the captured image of the user. The processing unit may be further configured to make the determination regarding the height of the user based on an established reference position within a field of view of the camera. The processing unit may be further configured to cause the transit system vending machine to establish the reference position from second information captured by the camera during a calibration of the transit system vending machine. The processing unit may be further configured to cause the transit system vending machine to modify the established reference position based on the determination regarding the height of the user. The processing unit may be further configured to, when the triggering event is determined to comprise the user raising a hand to press one of the first set of one or more interactive controls, cause the second output to include the second set of displayed elements wherein the first set of one or more interactive controls are disposed in the second area of the touchscreen display. The triggering event may be determined to comprise the user raising the user's left hand to press one of the first set of one or more interactive controls, and the second area of the touchscreen display comprises a left-hand portion of the touchscreen display. The processing unit may be further configured to cause the transit system vending machine to determine that input data regarding locations of a plurality of touchscreen display inputs received by the user when pressing interactive controls on the touchscreen display is indicative of an offset between the locations of the plurality of touchscreen display inputs and the locations of the corresponding interactive controls; and automatically adjusting a position of at least the interactive controls on the touchscreen display to compensate for the offset.

An example method of automatic user interface adaption in a transit system vending machine, according to the description, comprises: displaying, with a touchscreen display, a first output in accordance with a first layout. The first layout configuration determines a first area of the touchscreen display in which one or more interactive controls are located, and the first output comprises a first set of displayed elements including a first set of one or more interactive controls disposed in the first area of the touchscreen display and at least one other displayed element. The method also comprises capturing an image of a user of the transit system vending machine with a camera, and analyzing, with a processing unit of the transit system vending machine, the captured image of the user to determine that a triggering event occurred. The triggering event comprising the user approaching the transit system vending machine, or the user raising a hand to press one of the first set of one or more interactive controls. The method further comprises, in response to determining that a triggering event occurred, causing the transit system vending machine to automatically generate and display a second output on the touchscreen display in accordance with a second layout configuration. The second layout configuration determines a second area of the touchscreen display in which one or more interactive controls are located, and the second area is different than the first area.

The example method can comprise one or more of the following features. The method may comprise, when the triggering event is determined to comprise the user approaching the transit system vending machine, cause the second output to include, in the second area of the touchscreen display, the first set of one or more interactive controls. The method may comprise determining, from first image information captured by the camera, that a height of the user is above a certain threshold, wherein the second area of the touchscreen display comprises an upper portion of the touchscreen display. The method may comprise making the determination regarding the height of the user based on an established reference position within a field of view of the camera. The method may comprise causing the transit system vending machine to establish the reference position from second information captured by the camera during a calibration of the transit system vending machine. The method may comprise causing the transit system vending machine to modify the established reference position based on the determination regarding the height of the user. The method may comprise, when the triggering event is determined to comprise the user raising a hand to press one of the first set of one or more interactive controls, causing the second output to include the second set of displayed elements wherein the first set of one or more interactive controls are disposed in the second area of the touchscreen display. The triggering event may be determined to comprise the user raising the user's left hand to press one of the first set of one or more interactive controls, and the second area of the touchscreen display comprises a left-hand portion of the touchscreen display. The method may comprise determining that input data regarding locations of a plurality of touchscreen display inputs received by the user when pressing interactive controls on the touchscreen display is indicative of an offset between the locations of the plurality of touchscreen display inputs and the locations of the corresponding interactive controls; and automatically adjusting a position of at least the interactive controls on the touchscreen display to compensate for the offset.

An example non-transitory machine-readable medium, according to the description, has instructions embedded thereon for providing automatic user interface adaption in a transit system vending machine. The instructions include computer code for displaying, with a touchscreen display, a first output in accordance with a first layout configuration, where the first layout configuration determines a first area of the touchscreen display in which one or more interactive controls are located, and the first output comprises a first set of displayed elements including a first set of one or more interactive controls disposed in the first area of the touchscreen display and at least one other displayed element. The instructions also include computer code for capturing an image of a user of the transit system vending machine with a camera, analyzing, with a processing unit of the transit system vending machine, the captured image of the user to determine that a triggering event occurred. The triggering event comprises the user approaching the transit system vending machine, or the user raising a hand to press one of the first set of one or more interactive controls. The instructions also include computer code for, in response to determining that a triggering event occurred, causing the transit system vending machine to automatically generate and display a second output on the touchscreen display in accordance with a second layout configuration. The second layout configuration determines a second area of the touchscreen display in which one or more interactive controls are located, and the second area is different than the first area.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION OF THE INVENTION

The ensuing description provides embodiments only, and is not intended to limit the scope, applicability or configuration of the disclosure. Rather, the ensuing description of the embodiments will provide those skilled in the art with an enabling description for implementing an embodiment. In view of the disclosure, a person of ordinary skill in the art will understand various changes may be made in the function and arrangement of elements.

Passengers of transit systems often utilize transit vending machines to obtain information regarding the transit system and/or purchase transit products and services, rather than seeing a human transit agent. Although these transit vending machines can facilitate purchases and obtaining information with interactive touchscreen displays, the user interface displayed thereon can often fail to accommodate or adjust to the needs of an individual transit vending machine user.

One way in which the user interface may fail to accommodate or adjust to the needs of an individual user is by placing interactive controls at a location on the touchscreen display that may be inconvenient or hard to reach for a user. For example, buttons may be located on the right-hand portion of the display to accommodate a user interacting with the touchscreen display with the user's right hand. This may be an inconvenience to users preferring to use their left hand, in which case the use of their left hand may cause their left arm to obstruct their view of the screen. In another example, interactive controls such as selection buttons may be located at the bottom of a touchscreen display screen for shorter users or users in wheelchairs. However, relatively tall users may find the location of these controls inconvenient. Where interactive controls may be located at the top of the touchscreen display, shorter users may not be able to reach the controls. The larger the touchscreen display utilized, the more the location of interactive controls could present a problem to users.

Embodiments of the present invention described herein provide for a transit vending machine that addresses these and other issues by automatically adjusting a layout of the user interface based on information determined about the user. As detailed below, information about the user can be indicative of user height, hand used to interact with the touchscreen display, an offset of user input, and the like.

Figure 1:
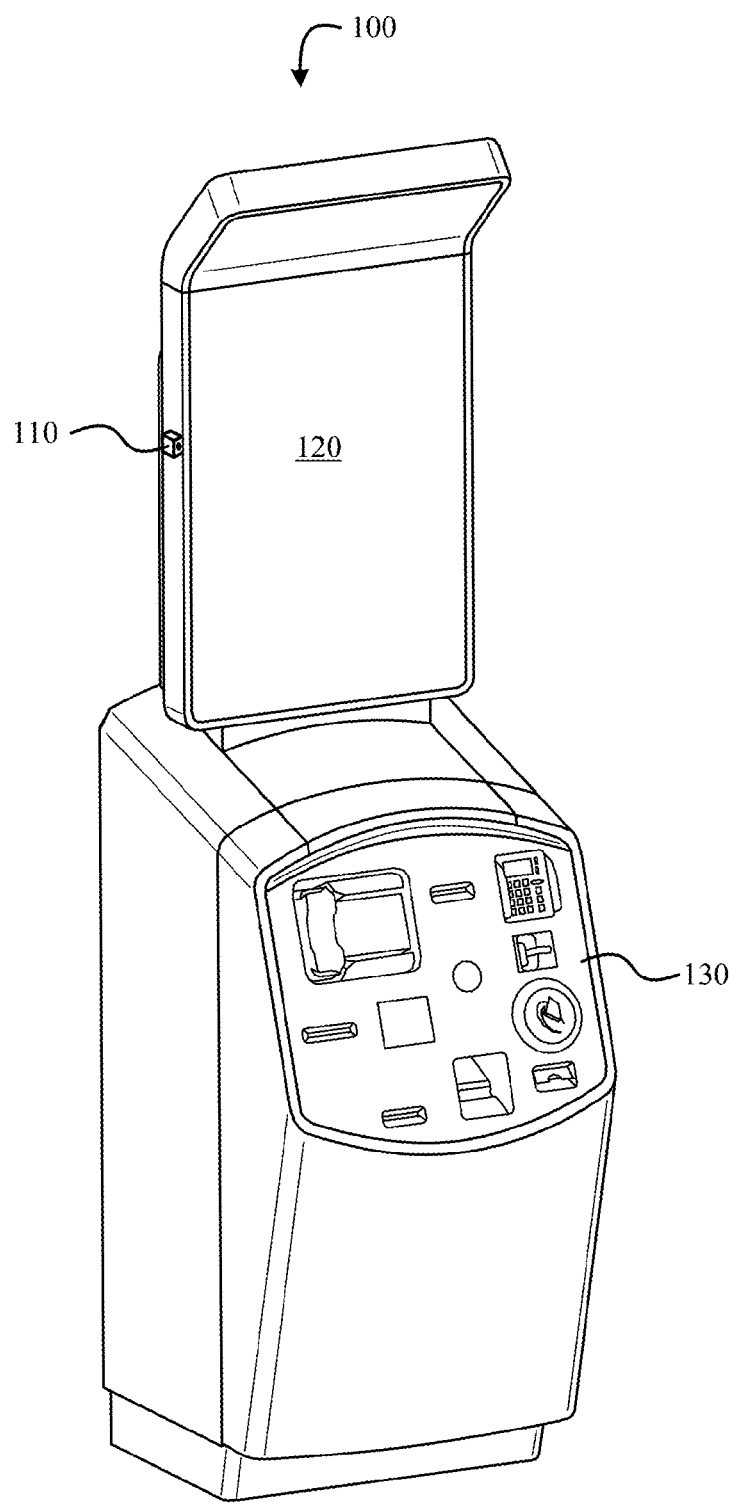
FIG. 1 is an illustration of a transit vending machine that can be configured to execute the techniques disclosed herein, according to one embodiment.

FIG. 1 is an illustration of a transit vending machine 100 that can be configured to execute the techniques disclosed herein, according to one embodiment. Among other things, the transit vending machine 100 may include a camera 110, touchscreen display 120, and a component panel 130. It will be understood that the transit vending machine 100 illustrated here is provided as an example only, and that other embodiments might include variations on the configuration illustrated. For example, alternative embodiments may add, omit, combine, separate, and/or substitute components with those shown. A person of ordinary skill in the art will recognize many variations.

The touchscreen display 120 enables a user to interact with the transit vending machine 100 by, for example, providing a user interface having interactive controls, such as virtual buttons, switches, dials, and/or other input elements. The user interface may also include a variety of other displayed elements that may not be interactive, such as text, advertising, a background image, and the like. The location of the touchscreen display 120 relative to the rest of the transit vending machine 100 may vary, depending on desired functionality, regulatory requirements, and/or other factors.

The touchscreen display 120 may be implemented using any of a variety of technologies. The display subcomponent, for example, may include an liquid-crystal display (LCD), light-emitting diode (LED), organic LED (OLED), Active-Matrix OLED (AMOLED), and/or other active matrix technologies. The touch sensor subcomponent of the touchscreen display may be implemented using resistive, capacitive, and/or inductive touch-sensing technologies, for example. Calibration may be required to help ensure proper correlation of the input touch data and the output display data so that the touch input is properly "aligned" with what is displayed (e.g., an interactive control). As discussed below, techniques are provided herein that can provide for offset compensation where the touch input and display output are not properly aligned.

The camera 110 can be mounted on the transit vending machine 100 to capture images of a user interacting with the transit vending machine 100. Although the embodiment shown in FIG. 1 has a camera mounted adjacent to the touchscreen display 120 at approximately an eye level of a user, the location of the camera 110 can vary and may be positioned and/or angled differently than the camera 110 illustrated in FIG. 1.

Depending on desired functionality, the camera 110 can employ any of a variety of technologies. In some embodiments, for example, the camera is a complementary metal-oxide semiconductor (CMOS) camera. Furthermore, the camera may be operated in different ways, depending on desired functionality. In some embodiments, for example, the transit vending machine 100 may be capable of providing real-time video interaction between a user and an agent (e.g., at a call center). In such embodiments, the transit vending machine 100 may send and receive video data (e.g., via a communication interface, which may comprise a modem). (Video data may include sound as well. Thus, the transit vending machine 100 may include one or more microphones and/or speakers to allow the user to audibly communicate with the agent.) The quality of the video may, in part, be due to the images captured by the camera 110. To help achieve high quality video, the resolution and/or frame rate of the camera may be relatively high (e.g., a resolution of 720×480 pixels, 1280×720 pixels, 1920×1080 pixels, etc., and/or a frame rate of 16 frames per second (fps), 24 fps, 30 fps, etc.). The resolution and/or frame rate may be operated at lower rates for other purposes, such as to capture security footage, to capture images of the user for computer vision/image analysis purposes (as described in more detail below), or for other situations where high-resolution images may not be needed or desirable.

Component panel 130 may include a variety of input and/or output devices to enable the transit vending machine 100 to conduct transactions and/or provide additional interaction with users. Input devices provided on the component panel 130 can include, for example, one or more keypads, keyboards, buttons, touchpads, barcode readers, magnetic strip readers, radio frequency identification (RFID) scanners, money handlers (e.g., bill and/or coin handlers), and the like. Output devices provided on the component panel 130 can include, for example, one or more thermal, dot matrix, or laser printers, magnetic strip card printers, RFID transmitters for modifying RFID chip of media fare, ticket and/or card dispensers, radio transmitters configured to send signals to a smartphone, cellphone or other device of the user, and the like.

Figure 2:
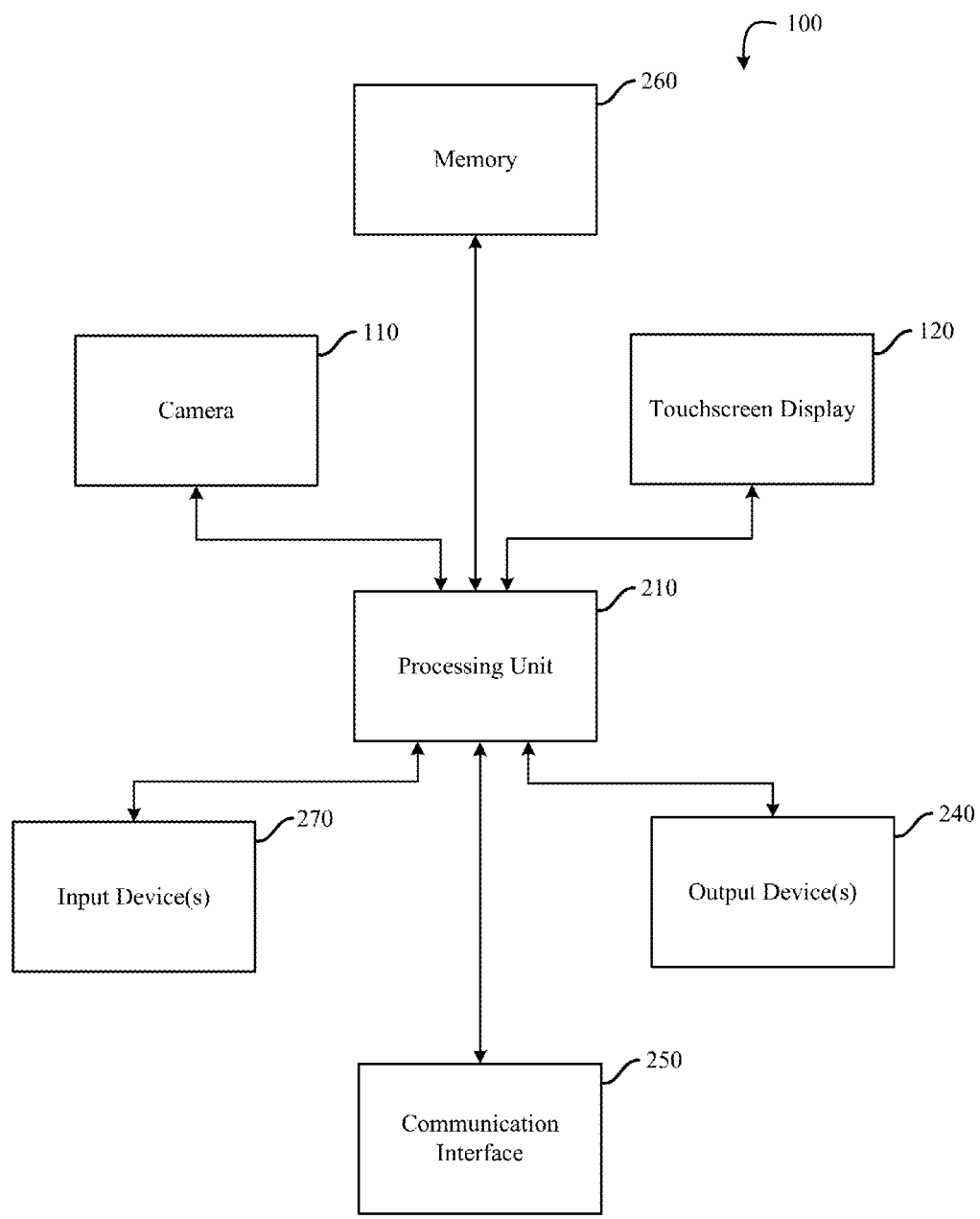
FIG. 2 illustrates a block diagram of electrical components of a transit vending machine, such as the transit vending machine of FIG. 1, according to an embodiment.

FIG. 2 illustrates a block diagram of electrical components of a transit vending machine 100, such as the transit vending machine 100 of FIG. 1, according to an embodiment. Here, the transit vending machine has a camera 110 and touchscreen display 120 as shown in FIG. 1. Here, additional components such as input device(s) 270, output device(s) 240, memory 260, communication interface 250, and processing unit 210 are illustrated. As with other figures herein, the components illustrated in FIG. 2 are provided as an example only, and other embodiments might include variations on the configuration illustrated. For example, alternative embodiments may add, omit, combine, separate, and/or substitute components with those shown. A person of ordinary skill in the art will recognize many variations. The illustrated arrows represent data channels, which may be implemented using, for example, the data bus connecting the various illustrated components.

Depending on desired functionality, the blocks illustrated in FIG. 2—such as camera 110 and touchscreen display 120—may correlate with those shown in FIG. 1. Input device(s) 260 and output device(s) 240 may include input and/or output devices as previously described in relation to the component panel 130 of FIG. 1. According to some embodiments, input device(s) 260 and/or output device(s) 240 may additionally or alternatively include separate devices, such as a separate cash-handling machine, vending apparatus, and the like, which may be coupled with the transit vending machine 100 via the communication interface 250 (e.g., using a wireless and/or wired connection).

The memory 260 can comprise a working memory, such as a random access memory (RAM) or read-only memory (ROM) device. The memory 260 may include software elements such as an operating system, device drivers, executable libraries, and/or other code, such as one or more applications, which may comprise computer programs provided by various embodiments, and/or may be designed to implement methods, and/or configure systems, provided by other embodiments, as described herein. That is, one or more procedures described herein might be implemented as code and/or instructions executable by a transit vending machine 100 (and/or a processing unit 210 within a transit vending machine 100).

The memory 260 may further can comprise a storage memory that may enable the transit vending machine 100 to store one or more databases and/or other data objects locally. Software elements and/or data objects may be stored as instructions and/or code on a non-transitory computer-readable storage medium of the memory 260. The storage medium may utilize removable and/or permanent storage, which may employ one or more storage technologies based on magnetic, optical, solid state, and/or other technologies. The instructions and/or code may be executable by the processing unit 210 and/or might take the form of source and/or installable code, which, upon compilation and/or installation on the transit vending machine 100 (e.g., using any of a variety of generally available compilers, installation programs, compression/decompression utilities, etc.), then may take the form of executable code.

The communication interface 250, may employ wireless and/or wired technologies to communicate data with other devices. As such, the communication interface 250 may comprise a modem, a network card (wireless or wired), an infrared communication device, a wireless communication device, and/or a chipset (such as a Bluetooth™ device, an IEEE 802.11 device, an IEEE 802.15.4 device, a WiFi device, a WiMax device, cellular communication facilities, UWB interface, etc.), and/or the like. The communication interface 250 may include one or more input and/or output communication interfaces, to permit data to be exchanged with a network, mobile devices, remote computer systems (e.g., the computer system of an agent, as described previously), and/or any other electronic devices described herein. Hence, the communication interface 250 may be used to receive and send data (e.g., video data, transaction data, etc.) as described in the embodiments herein.

The processing unit 210, may comprise localized or distributed circuitry configured to execute computer code to enable the transit vending machine 100 to, at least in part, provide the functionality described herein. As such, the processing unit 210 may comprise, without limitation one or more general-purpose processors, one or more special-purpose processors (such as digital signal processing chips, graphics acceleration processors, and/or the like), and/or other processing structure.

Figure 3:
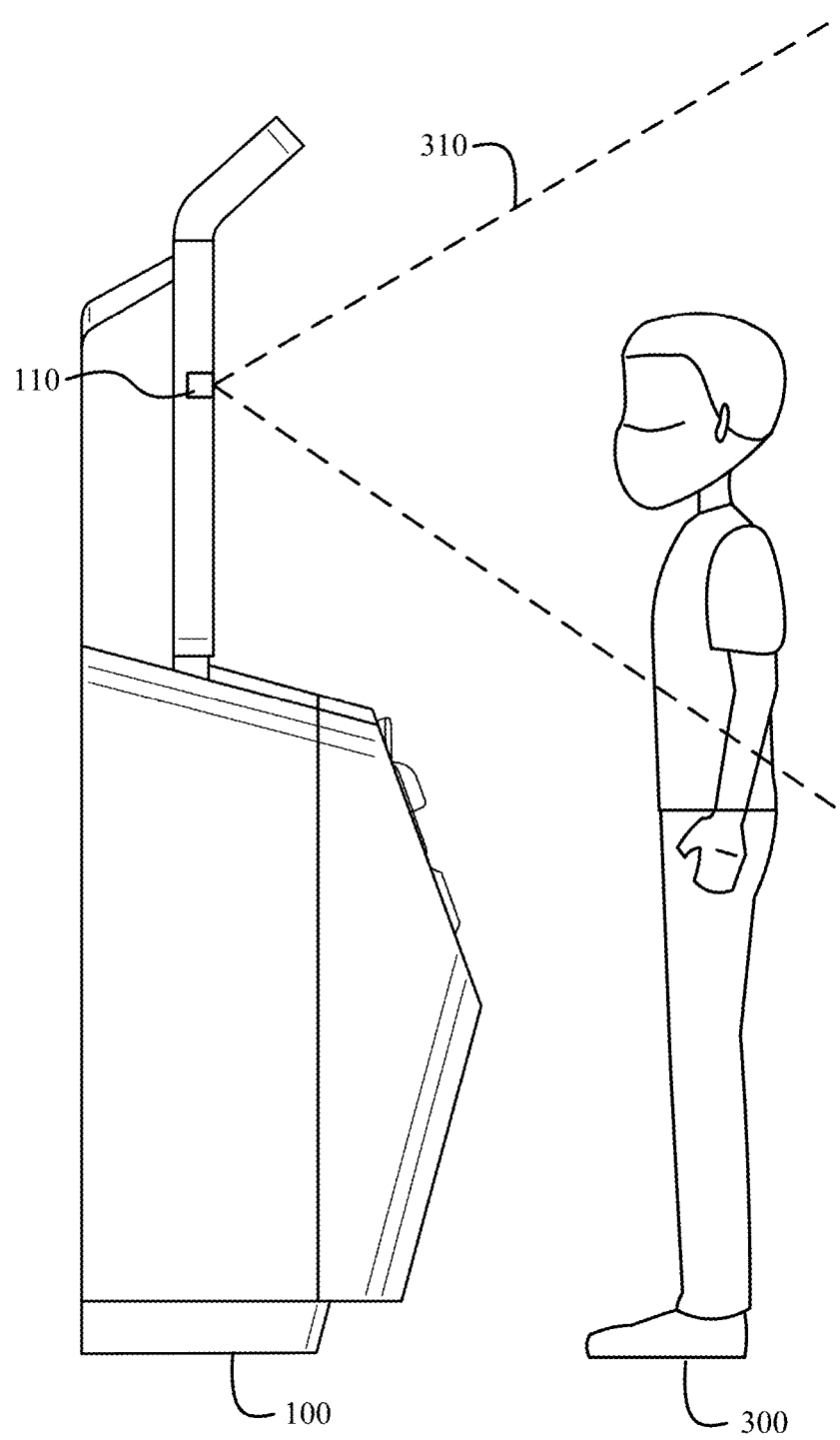
FIG. 3 is a simplified drawing of a transit vending machine and a user provided to help illustrate the basic scenario in which techniques herein may be implemented.

FIG. 3 is a simplified drawing to help illustrate the basic scenario in which techniques herein may be implemented. The drawing is a side view of a transit vending machine 100 and a transit user 300. Here, the transit user 300 is within the field of view (FOV) 310 of the camera 110 of the transit vending machine 100.

Figure 4A:
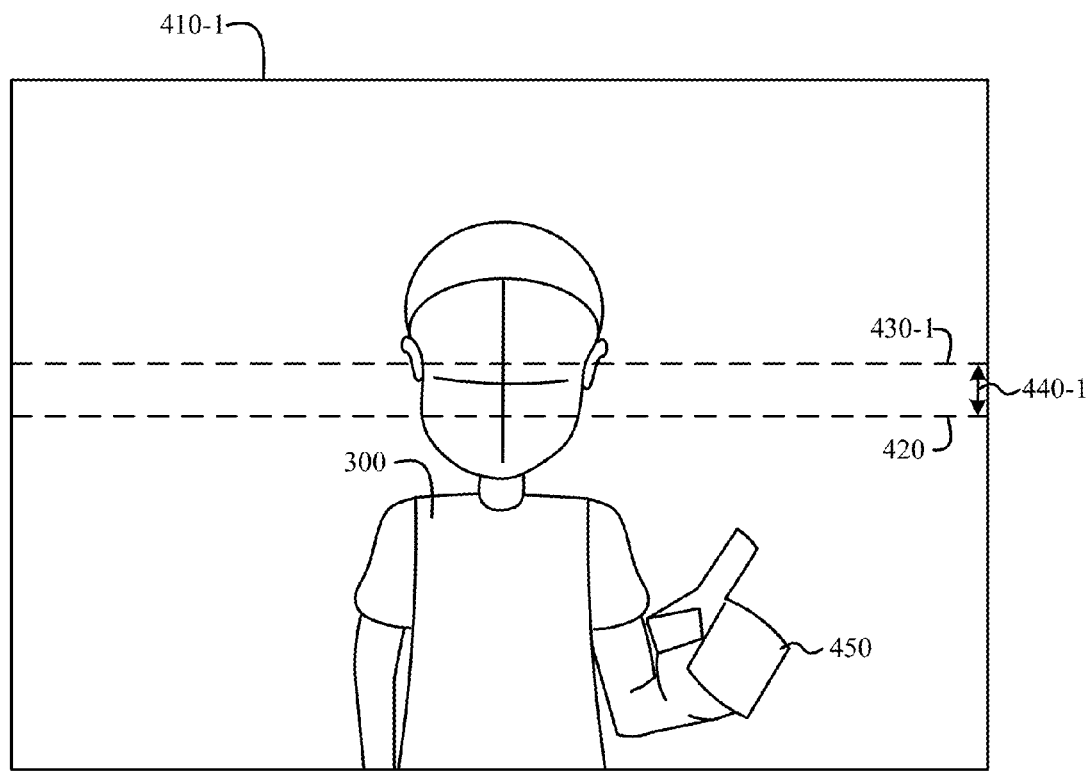
FIGS. 4A and 4B are simplified drawings of example images captured by the camera, according to embodiments.
Figure 5A:
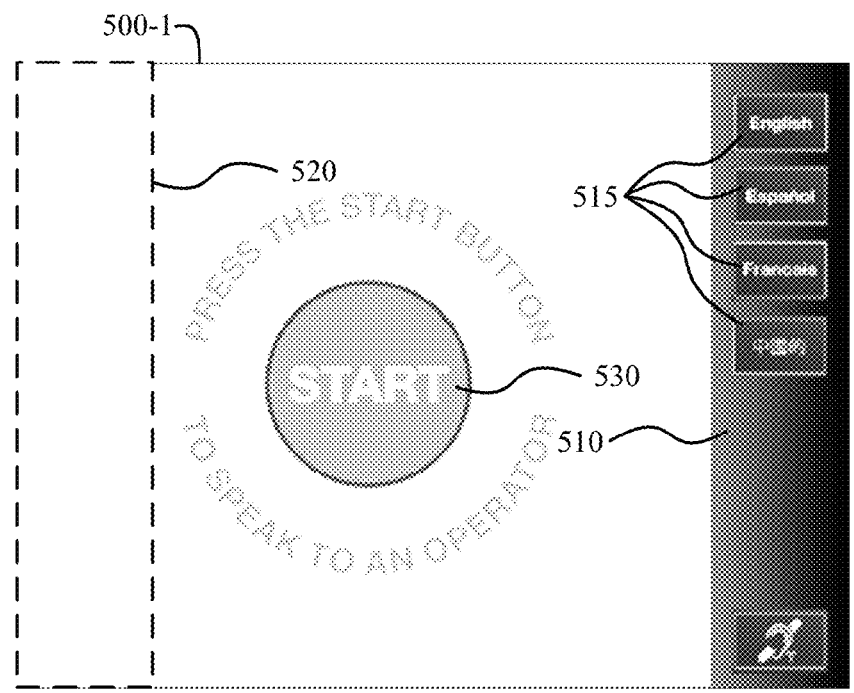
FIGS. 5A and 5B are example screenshots a graphical user interface displayed on the touchscreen display of a transit vending machine.

According to some embodiments, the transit vending machine 100 may provide automatic detection of left-hand interaction. Because most people are right handed, touchscreen displays—both inside and outside of the transit context—are often configured to accommodate users that use their right hands to interact with the user interface. And although this may not be a problem for many left-handed users, some users may not prefer—or may not even be physically able—to use their right hand to interact with the user interface on the touchscreen display. Thus, according to embodiments, the camera 110 can constantly monitor a user 300 of the transit vending machine 100. Software algorithms can detect which hand (or arm) is predominantly used during the interaction by analyzing the live camera stream. If left-handed use is detected, a control signal can be sent to the main user interface software. This software can then rearrange the user interface to make usage easier for a left handed passenger. This can include moving the main control elements (e.g., selection buttons or text input fields) to the left-hand side of the screen, swapping components already occupying that space to the other side. FIGS. 4A and 5A help illustrate how this may be implemented in certain embodiments. (It will be understood that, although embodiments described automatic detection left-handed interaction, embodiments may similarly apply to automatic detection of a right-handed interaction.)

FIG. 4A is a simplified drawing of an example image captured by the camera 110, according to one embodiment. As described earlier, the camera 110 of the transit vending machine 100 can capture images of a user 300 of the transit vending machine 100. The images may indicate which hand the user 300 users to interact with the touchscreen display of the transit vending machine. Here, the user 300 is using the user's left hand 450 to interact with the touchscreen display of the transit vending machine 100. Video analytics and/or other image processing may be performed on the image to determine where the user's hands and/or arms are located, in which hand is being used to interact with the touchscreen display of the transit vending machine 100. It will be understood that the video analytics may have to compensate for the angle and/or position at which the camera 110 may be located. In some embodiments, the camera 110 can provide a processing unit 210 with the image 410-1, and the processing unit 210 can perform the video analytics. In some embodiments, the video analytics need to be performed, at least in part, by separate processing circuitry. Although FIG. 4A illustrates the user's hand 450, the user's hand may not be viewable in some embodiments. Additionally or alternatively, this image 410-1 may represent an image captured immediately prior to the user 300 interacting with the touchscreen display of the transit vending machine 100. The video analytics used in various embodiments can include any of a variety of computer vision (CV) algorithms configured to identify body parts of a human user. This can include creating a wire mesh or other model of the user, comparing the image with one or more reference images of human users, or implementing other techniques for hand, arm, face, and/or other object recognition.

FIG. 5A is an example of a first screenshot 500-1 of a graphical user interface displayed on the touchscreen display 120 of the transit vending machine 100, provided here for illustrative purposes. In this figure, the user interface includes an area 510 with interactive controls 515 by which the user may provide user input to the transit vending machine 100. Here, the user interface further includes other elements 530, which may or may not be interactive. According to some embodiments, the other elements 530 can include pictures, text, advertisements, and/or other information for the user. According to some embodiments, once the transit vending machine 100 determines that a user is using his or her left hand to interact with the touchscreen display 120, the area 510 including the interactive controls can be moved to an area 520 on the left-hand side of the screen. According to some embodiments, the other elements 530 may be shifted to the right to provide sufficient room for the area 520 on the left-hand side of the screen occupied by the interactive controls.

To avoid confusion, moving the interactive controls to the left-hand side of the screen may occur after the user initially interacts with the touchscreen display. In other words, a user may initially touch and an interactive control in the area 510 on the right hand portion of the screen (e.g., using the his or her left hand), then, upon processing the user input, the transit vending machine 100 may output a user interface in which interactive controls are located in an area 520 on the left-hand side of the display. According to some embodiments, the size of the area 520 of the display in which interactive controls are located can vary. For example, in some embodiments, the left-hand side of the display may include any portion of the display to the left of the center of the display. In other embodiments, interactive controls may be more closely located to the left-hand border of the display.

Additional functionality can vary depending on desired implementation. In some embodiments, for example, the transit vending machine 100 may not react or alter the user interface if it is determined that a user uses both hands when interacting with the touchscreen display 120. As indicated previously, the determination of which hand is being used may be made by a first software application, and the user interface may be generated using a second software application, in which case the first software application indicates to the second software application which hand the user is using. In other embodiments, there may be a single software application that determines both functions. In some embodiments, the determination of which hand the user is using may be made at least in part by hardware. For example, in some embodiments, the camera 110 may include image processing hardware capable object recognition and/or producing processed data by which object recognition may be performed (e.g., by the processing unit 210) more easily. A person of ordinary skill in the art will understand that many variations may be made to the embodiments disclosed herein.

Figure 4B:
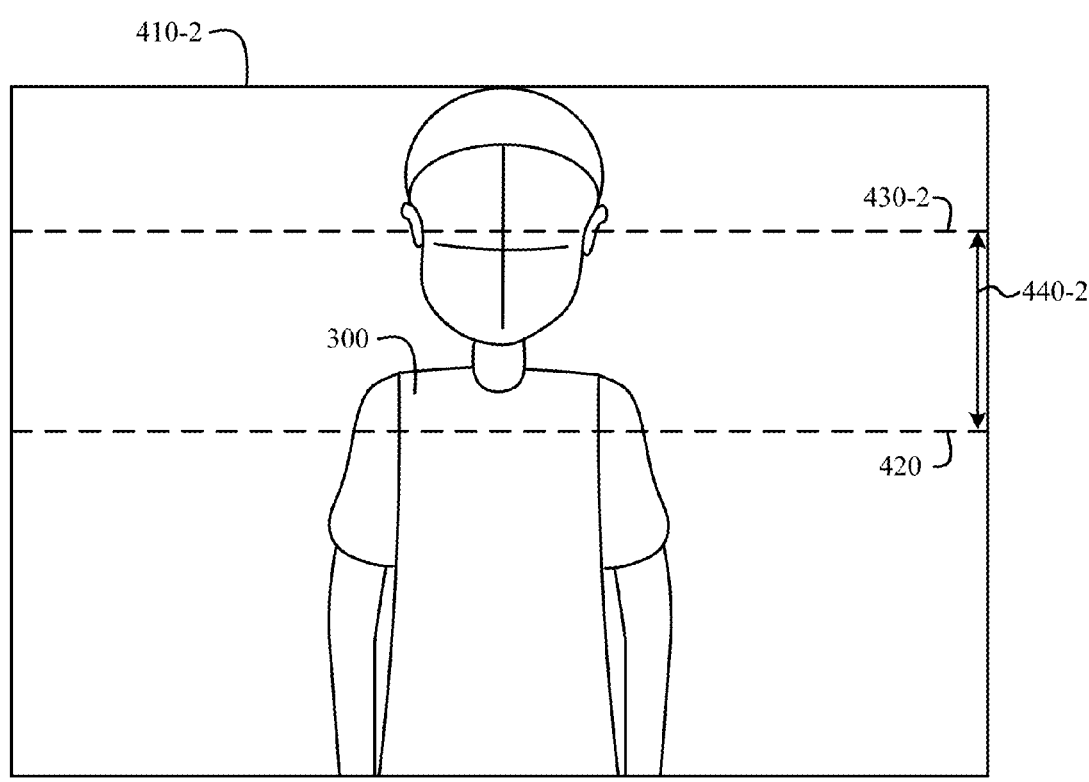
Figure 5B:

In a manner similar to the automatic detection of left-hand interaction described above, embodiments of a transit vending machine 100 may additionally or alternatively detect a height of the user 300 and move displayed elements of the user interface to adapt to the user's detected height. For example, the transit vending machine 100 may employ a facial detection algorithm capable of determining an estimate of a user's height based on a determination of where, within an image of the user, a face is detected. According to some embodiments, a control signal may then be sent from a facial- and/or height-detection software to user interface software, which can make the adaptations to the user interface discussed. FIGS. 4A, 4B, and 5B help illustrate how this may be implemented in certain embodiments. Although embodiments described herein utilized face detection for determining the height of a user, other embodiments may use the detection of one or more other body parts in the determination of the height of the user.

FIG. 4A illustrates how an image 410-1 of the user 300 can be used to determine a height of the user 300. Here, the image 410-1 includes an established reference height 420. (In some embodiments, the reference height 420 may simply bisect the image 410-1 at the center height of the image. In other embodiments, as described below, this reference height 420 may be above or below the center height of the image.) Using the image analysis, the transit vending machine 100 can determine where a user's face is, and in particular, a height at which the user eyes are located. Here, line 430-1 in the case the height at which the user's eyes are located. Depending on desired functionality, the reference height 420 can be located at a position determined to be the height at which an average user's eyes are located. Thus the distance 440-1 between the reference height 420 and the height at which the user's eyes are determined to be located 430-1 is indicative of how the user 300 may be taller or shorter than average. If the line 430-1 is higher than the reference height 420, then the user 300 is taller than average. If the determined height of the user's eyes 430-1 is lower than the reference height 420, then the user 300 is shorter than average. Depending on desired functionality, the default user interface may not change if the distance 440-1 (above or below the reference height 420) is less than a certain threshold.

FIG. 4B is an example second image 410-2 captured by a camera 110. Here, the user 300 is taller than the user 300 in FIG. 4A. Thus, a distance 440-2 between the reference height 420 and the determined height of this user's eyes 430-2 is much greater. Here, this distance may be greater than a predetermined threshold. If so, then the transit vending machine 100 can alter the output of the touchscreen display so that the user interface accommodates the user's height.

FIG. 5B is an example of a second screenshot 500-2 of a graphical user interface displayed on the touchscreen display 120 of the transit vending machine 100, provided here for illustrative purposes. In this figure, the user interface includes an area 540 at the bottom of the screen with interactive controls 515 by which the user may provide user input to the transit vending machine 100. As with FIG. 5A, the user interface further includes other elements 530, may or may not be interactive. If the user 300 is taller than a certain threshold height (e.g., the distance 440-2 above the reference height 420 at which the determined height of the user's eyes 430-2 is located exceeds a certain threshold), then the transit vending machine 100 can cause the interactive elements 515 to be moved to an upper portion 550 of the screen, thereby making them more easily accessible to taller users. According to some embodiments, the other elements 530 may be shifted downward to provide sufficient room for the upper portion 550 to be occupied with the interactive controls 515. According to some embodiments, the size of the upper portion 550 of the display in which interactive controls are located can vary. For example, in some embodiments, the upper portion 550 may include any portion of the display above the center of the display. In other embodiments, interactive controls may be located more closely to the top border of the display.

Features may vary depending on desired functionality. For example, the determination of the user's height may be made once the user 300 is within a distance at which the transit vending machine 100 is capable of detecting the users face. In some embodiments, determination of the user's height may be made once the user is within a certain distance from the transit vending machine 100. This distance may be determined using, for example, image data from the camera 110.

In some embodiments, the user interface may be large enough to accommodate several variations of where the interactive controls 515 may be located, depending on how tall the user is. Such functionality may be particularly helpful on larger touchscreen displays. For example if the user is taller than a certain threshold, the interactive controls 515 may be located at the top of the display. If the user is roughly of the average height, the interactive controls 515 may be located near the center of this display. If the user is shorter than a certain threshold, the interactive controls 515 may be located near the bottom of the display.

According to some embodiments, the determination of where the reference height 420 should be may be made during an initial configuration process. For example, a transit agent (or other person) configuring the transit vending machine 100 for the first time may cause the transit vending machine 100 to enter a configuration mode in which the transit vending machine 100 sets a height at which the reference height 420 is to be located. To configure the transit vending machine 100, the transit agent may provide a configuration marker, such as a paper or poster with one or more markings (e.g., a horizontal line, a boarder, dots, arrows, etc.) on it, detectable by the transit vending machine 100 (via image processing) and located at a specific height to reflect the height of an average user of the transit vending machine 100. The transit vending machine 100 can then decipher the markings to determine where artists at the reference height 420. Alternatively, the transit agent may step in front of the camera and press a button to set the reference height 420, based on the transit agent's height. Using similar techniques, the transit agent may additionally set thresholds for the transit vending machine to set the heights at which the user interface may be modified to accommodate different heights of different users. According to some embodiments, the transit agents may, after setting a certain height (e.g., a height for tall, average, or short users), touch an area of the screen at which interactive controls 515 may be located to accommodate users for that certain height.

According to some embodiments, the transit vending machine 100 may be configured to modify the height of the reference height 420, based on interactions with users. For example, after a threshold number of interactions (e.g., hundreds, thousands, etc.) with the users, the transit vending machine many increase or decrease the height at which the reference height 420 is located, based on an average height of the users of the interactions, as determined by the transit vending machine 100. In such embodiments, the transit vending machine 100 may not determine the actual height of the users, but may determine an average user height within captured images 410, and adjust the reference height 420 accordingly. In some embodiments, rather than waiting for a threshold number of interactions, the transit vending machine 100 many adjust the reference height 420 after each interaction, based on a running weighted average height for all users.

Additionally or alternatively to the functionality described above, the transit vending machine 100 may be configured to detect users persistently pressing next to control elements on the screen (such as button). Users may not accurately press a location of a control element due to a variety of factors, such as the user's height, visual impairments, and/or perspective distortions due to thick safety glass in front of the touchscreen display. If there is consistency to the offset (or difference in locations) between the location of the user's touch and the location at which the corresponding control is displayed, the transit vending machine 100 can compensate for the offset by adjusting the location of the controls for any future touches by the user. Accordingly, this can make usage of the device easier and more comfortable for the user.

Figure 6A:
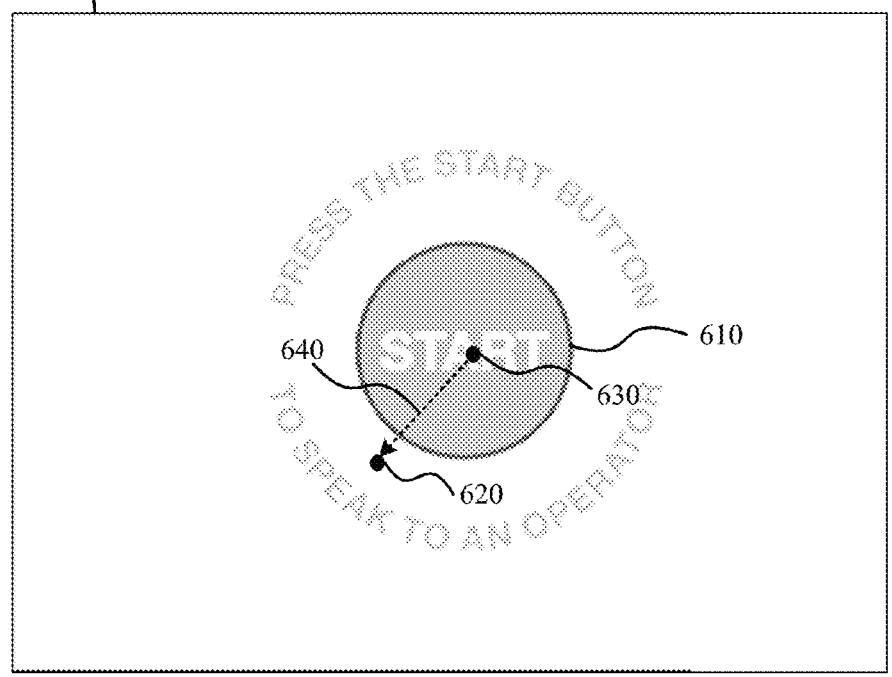
FIGS. 6A and 6B are example screenshots of a user interface of the transit vending machine, illustrating how the transit vending machine can compensate for an offset as described herein.
Figure 6B:
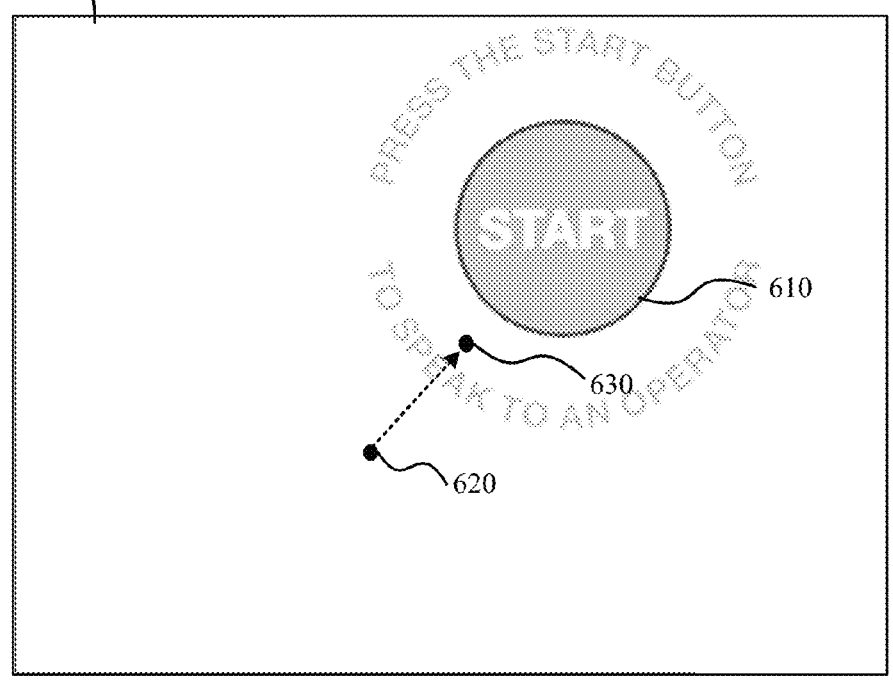

FIGS. 6A and 6B are example screenshots 600 of a user interface of the transit vending machine 100, shown on the touchscreen display 120, illustrating how the transit vending machine 100 can compensate for the offset described above. Here, the location 630 of the center of the interactive control 610, according to the transit vending machine 100, may be at coordinate (x1, y1) of the display (as measured by pixels and corresponding touch input). However, the user may persistently press a second location 620 located at coordinates (x2, y2). Thus, the distance 640 between the first location 630 and the second location 620, can be considered an offset of the touchscreen display 120 of the transit vending machine 100. To compensate for this offset, the transit vending machine 100 can move the interactive control 610 (and, optionally, all displayed elements) in the direction opposite the offset, as shown in FIG. 6B. This will bring the user input up to where the input is expected to be received, at the first location 630. (It can be noted that, although the interactive control 610 moves during compensation, the user will continue to press, from the user's perspective, the interactive control.)

The functionality of compensating for the offset can vary, depending on implementation. For example, the transit vending machine 100 can compensate for the offset after determining the offset from a threshold number of inputs by the user. In some embodiments, the threshold number of inputs may be as little as two or three. In other embodiments, the threshold number of inputs may be higher. In some instances, the offset may be located within the interactive control 610, but still offset from the center of the interactive control 610. In other instances the outset may be located outside of the interactive control 610. In such instances, the transit vending machine 100 may interpret the input as an intended press (or other input) of the nearest interactive control 610, where multiple interactive controls are displayed. In some embodiments compensating for the offset may be conducted (and reset) on a per user basis. In some embodiments, this compensation may be determined from the interactions of multiple users, where the offset among the multiple users is similar or the same. (In other words, if a similar offset is determined for a threshold number of users, the transit vending machine 100 may make compensation for the offset permanent.)

Figure 7:
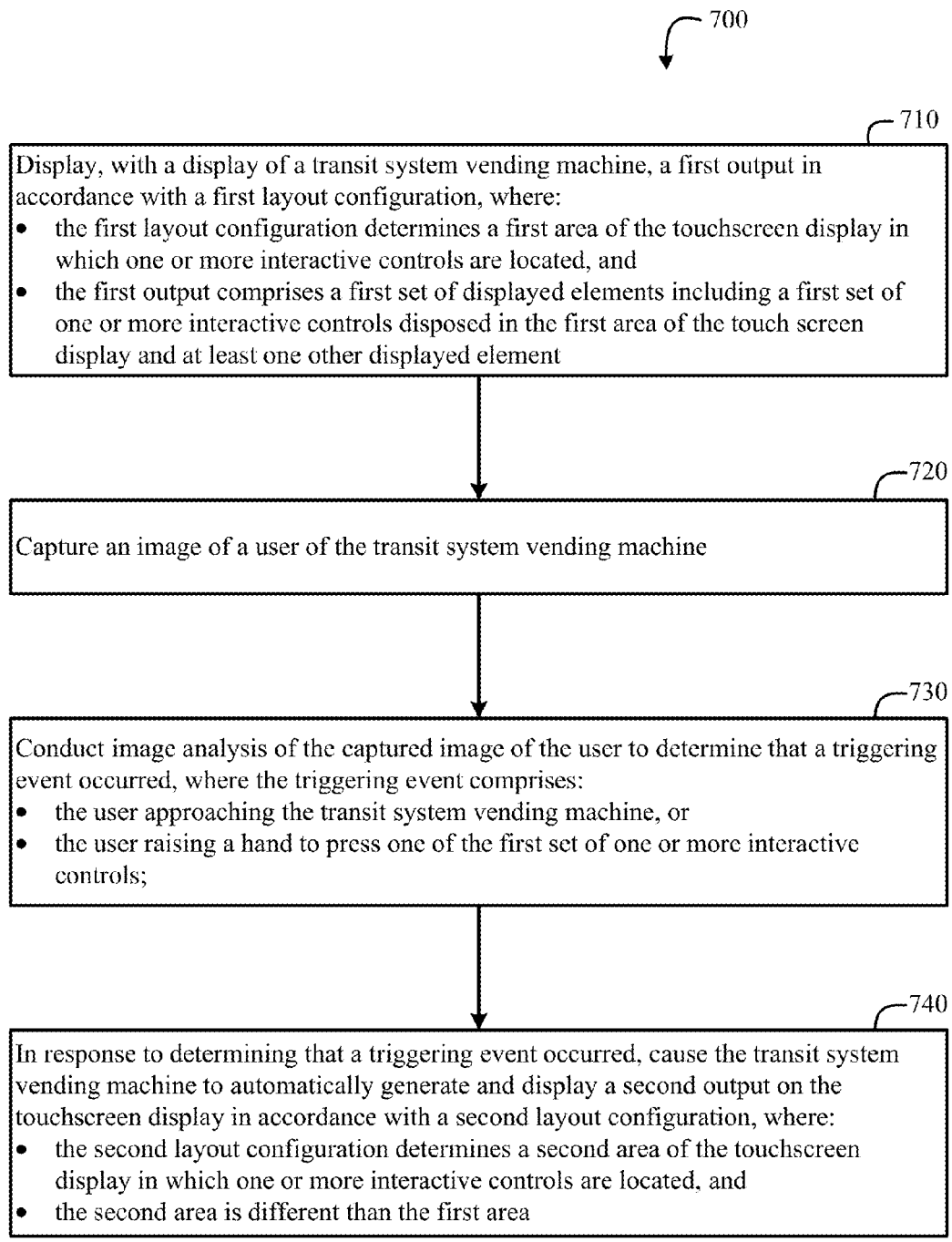
FIG. 7 is a flow diagram of a method of automatically modifying a user interface of a transit system vending machine according to an embodiment.

FIG. 7 is a flow diagram 700 of a method of automatically modifying a user interface of a transit system vending machine according to an embodiment. (Here, the transit system vending machine may correspond to the transit vending machine 100 described in the embodiments provided above.) As with other figures provided herein, FIG. 7 is provided as a non-limiting example. Alternative embodiments may include additional functionality to that shown in the figure, and/or the functionality shown in one or more of the blocks in the figure may be omitted, combined, separated, and/or performed simultaneously. Means for performing the functionality of the blocks may include one or more hardware and/or software components, such as those shown in FIG. 2. A person of ordinary skill in the art will recognize many variations.

At block 710, a first output is displayed in accordance with a first layout configuration, where the first layout configuration determines a first area of the touchscreen display in which one or more interactive controls are located, and the first output comprises a first set of displayed elements including a first set of one or more interactive controls disposed in the first area of the touchscreen display and at least one other displayed element. The embodiment shown in FIG. 5A, for instance, included a first layout configuration having a first area 510 (in which interactive controls 515 are located) on the right-hand side of the display. For the embodiment shown in FIG. 5B, the first layout configuration includes the first area 540 in a lower portion of the display. Both FIGS. 5A and 5B include other displayed elements 530.

At block 720, an image of a user of the transit system vending machine is captured. As described above, the image may be captured by a camera of the transit system vending machine and provided to a processing unit and/or other processing circuitry for analysis. In some embodiments, the camera may capture video images. Thus, the image may be a frame of video. Depending on desired functionality, the capture of the image may be triggered by various occurrences. Such occurrences may include, for example, face detection, proximity detection, received user input, and/or other occurrences. In some embodiments, the transit system vending machine may continuously capture images, without any such occurrences.

At block 730, image analysis of the captured image of the user is conducted to determine that a triggering event occurred. The triggering event here comprises the user approaching the transit system vending machine, or the user raising a hand (or arm) to press one of the first set of one or more interactive controls. As illustrated in the embodiments of off, triggering events can cause the transit system vending machine to alter its output, changing a user interface to accommodate a particular user. As detailed above, the triggering event where the user approaches the transit system vending machine can cause the transit system vending machine to alter user interface based on the user's height. The triggering event where the user raises a hand to press one of the first set of one or more interactive controls may cause the transit system vending machine to alter user interface based on which hand or arm the user uses to interact with the transit system vending machine.

The functionality at block 740 includes, in response to determining that a triggering event occurred, causing the transit system vending machine to automatically generate and display a second output on the touchscreen display in accordance with a second layout configuration, where the second layout configuration determines a second area of the touchscreen display in which one or more interactive controls are located, and the second area is different than the first area. The embodiment shown in FIG. 5B, for instance, included a second layout configuration having a second area 520 in which interactive controls 515 are located, where the second area 520 is on the left-hand side of the display. For the embodiment shown in FIG. 5B, the second layout configuration includes the second area in an upper portion 550 of the display.

The method illustrated in FIG. 7 can include many additional functions, depending on desired functionality. For example, when the triggering event is determined to comprise the user approaching the transit system vending machine, the method may include causing the second output to include, in the second area of the touchscreen display, the first set of one or more interactive controls. That is, the first set of one or more interactive controls may be repositioned on the display to accommodate a user approaching the transit system vending machine. According to some embodiments, when it is determined from first image information (e.g., one or more images) captured by the camera, a height of the user is above a certain threshold, the second area of the touchscreen display may comprise an upper portion of the touchscreen display. Moreover, as indicated previously, the determination regarding the height of the user may be based on the image information, and the image information may comprise the image of a user captured at block 720. As described above, making the determination regarding the height of the user may be based on an established reference position within a field of view of the camera. According to some embodiments, the transit system vending machine may establish the reference position from second information captured by the camera during a calibration of the transit system vending machine. Moreover, the transit system vending machine may be configured to modify the established reference position based on the determination regarding the height of the user.

The method illustrated in FIG. 7 can include functions in addition or as an alternative to those listed above. In some embodiments, for example, the triggering event may be determined to comprise the user raising the user's left hand or arm to press one of the first set of one or more interactive controls, and the second area of the touchscreen display comprises a left-hand portion of the touchscreen display. In some embodiments, as described above in relation to FIGS. 6A and 6B, the method may include determining that input data regarding the locations of a plurality of touchscreen display inputs received by the user when pressing interactive controls on the touchscreen display is indicative of an offset between the locations of the plurality of touchscreen display inputs and the locations of the corresponding interactive controls. In such cases, the method may comprise automatically adjusting a position of at least the interactive controls on the touchscreen display to compensate for the offset. Other elements on the touchscreen display may be adjusted as well.

It will be apparent to those skilled in the art that substantial variations to the embodiments described herein above may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A transit system vending machine comprising: a touchscreen display configured to display an output, wherein:
   the output comprises a set of displayed elements including a set of one or more interactive controls disposed in a first area of the touchscreen display and at least one other displayed element disposed in a second area of the touchscreen display; and
   the first area of the touchscreen display comprises a right-hand portion of the touchscreen display and the second area of the touchscreen display comprises a left-hand portion of the touchscreen display;
a camera configured to capture an image of a user of the transit system vending machine and provide the captured image to a processing unit; and
the processing unit, communicatively coupled to the touchscreen display and the camera, wherein the processing unit is configured to perform operations including: causing the touchscreen display to display the output; receiving user input corresponding to the user pressing one of the set of one or more interactive controls;
receiving the captured image of the user from the camera; after receiving the captured image, conducting image analysis of the captured image of the user to determine that a triggering event occurred, the triggering event comprising:
the user approaching the transit system vending machine, and the user raising a left arm to press one of the set of one or more interactive controls; and
after determining that the triggering event occurred and after receiving the user input causing the touchscreen display to automatically rearrange the output by moving the one or more interactive controls from the first area of the touchscreen display to the second area of the touchscreen display and by moving the at least one other displayed element from the second area of the touchscreen display to the first area of the touchscreen display;
determining that input data regarding locations of a plurality of touchscreen display inputs received by the user when pressing interactive controls on the touchscreen display is indicative of an offset between the locations of the plurality of touchscreen display inputs and the locations of the corresponding interactive controls; and automatically adjusting a position of at least the interactive controls on the touchscreen display to compensate for the offset.

2. The transit system vending machine of claim 1, wherein the processing unit is further configured to determine, from first image information captured by the camera, that a height of the user is above a certain threshold.

3. The transit system vending machine of claim 2, wherein the processing unit is further configured to make the determination regarding the height of the user based on the image information, wherein the image information comprises the captured image of the user.

4. The transit system vending machine of claim 2, wherein the processing unit is further configured to make the determination regarding the height of the user based on an established reference position within a field of view of the camera.

5. The transit system vending machine of claim 4, wherein the processing unit is further configured to cause the transit system vending machine to establish the reference position from second information captured by the camera during a calibration of the transit system vending machine.

6. The transit system vending machine of claim 4, wherein the processing unit is further configured to cause the transit system vending machine to modify the established reference position based on the determination regarding the height of the user.

7. A method of automatic user interface adaption in a transit system vending machine, the method comprising:
displaying, with a touchscreen display, an output, wherein: the output comprises a set of displayed elements including a set of one or more interactive controls disposed in a first area of the touchscreen display and at least one other displayed element disposed in a second area of the touchscreen display; and the first area of the touchscreen display comprises a right-hand portion of the touchscreen display and the second area of the touchscreen display comprises a left-hand portion of the touchscreen display; causing the touchscreen display to display the output; receiving user input corresponding to a user pressing one of the set of one or more interactive controls; capturing an image of the user of the transit system vending machine with a camera; after capturing the image, analyzing, with a processing unit of the transit system vending machine, the captured image of the user to determine that a triggering event occurred, the triggering event comprising:

the user approaching the transit system vending machine, and the user raising a left hand to press one of the set of one or more interactive controls; and after determining that the triggering event occurred and after receiving the user input causing the touchscreen display to automatically rearrange the output by moving the one or more interactive controls from the first area of the touchscreen display to the second area of the touchscreen display and by moving the at least one other displayed element from the second area of the touchscreen display to the first area of the touchscreen display;

determining that input data regarding locations of a plurality of touchscreen display inputs received by the user when pressing interactive controls on the touchscreen display is indicative of an offset between the locations of the plurality of touchscreen display inputs and the locations of the corresponding interactive controls; and automatically adjusting a position of at least the interactive controls on the touchscreen display to compensate for the offset.

8. The method of automatic user interface adaption in a transit system vending machine as in claim 7, further comprising determining, from first image information captured by the camera, that a height of the user is above a certain threshold.

9. The method of automatic user interface adaption in a transit system vending machine as in claim 8, further comprising making the determination regarding the height of the user based on an established reference position within a field of view of the camera.

10. The method of automatic user interface adaption in a transit system vending machine as in claim 9, further comprising causing the transit system vending machine to establish the reference position from second information captured by the camera during a calibration of the transit system vending machine.

11. The method of automatic user interface adaption in a transit system vending machine as in claim 9, further comprising causing the transit system vending machine to modify the established reference position based on the determination regarding the height of the user.

12. A non-transitory machine-readable medium having instructions embedded thereon for providing automatic user interface adaption in a transit system vending machine, instructions including computer code for:

displaying, with a touchscreen display, an output, wherein: the output comprises a set of displayed elements including a set of one or more interactive controls disposed in a first area of the touchscreen display and at least one other displayed element disposed in a second area of the touchscreen display; and the first area of the touchscreen display comprises a right-hand portion of the touchscreen display and the second area of the touchscreen display comprises a left-hand portion of the touchscreen display;

causing the touchscreen display to display the output; receiving user input corresponding to a user pressing one of the set of one or more interactive controls; capturing an image of the user of the transit system vending machine with a camera;

after capturing the image, analyzing, with a processing unit of the transit system vending machine, the captured image of the user to determine that a triggering event occurred, the triggering event comprising:

the user approaching the transit system vending machine, and the user raising a left hand to press one of the set of one or more interactive controls; and after determining that the triggering event occurred and after receiving the user input causing the touchscreen display to automatically rearrange the output by moving the one or more interactive controls from the first area of the touchscreen display to the second area of the touchscreen display and by moving the at least one other displayed element from the second area of the touchscreen display to the first area of the touchscreen display;

determining that input data regarding locations of a plurality of touchscreen display inputs received by the user when pressing interactive controls on the touchscreen display is indicative of an offset between the locations of the plurality of touchscreen display inputs and the locations of the corresponding interactive controls; and automatically adjusting a position of at least the interactive controls on the touchscreen display to compensate for the offset.

* * * * *